(12) United States Patent
Walsham

(10) Patent No.: US 8,856,110 B2
(45) Date of Patent: Oct. 7, 2014

(54) METHOD AND APPARATUS FOR PROVIDING A RESPONSE TO A QUERY

(75) Inventor: Peter Gordon Walsham, London (GB)

(73) Assignee: Meterfy Ltd., London (GB)

( * ) Notice: Subject to any disclaimer, the term of this patent is extended or adjusted under 35 U.S.C. 154(b) by 0 days.

(21) Appl. No.: 13/564,048

(22) Filed: Aug. 1, 2012

(65) Prior Publication Data

US 2014/0040248 A1 Feb. 6, 2014

(51) Int. Cl.
*G06F 17/30* (2006.01)
(52) U.S. Cl.
USPC ............... 707/723; 707/759; 707/E17.014
(58) Field of Classification Search
None
See application file for complete search history.

(56) References Cited

U.S. PATENT DOCUMENTS

| | | | |
|---|---|---|---|
| 8,346,791 B1 * | 1/2013 | Shukla et al. | 707/759 |
| 2007/0100796 A1 * | 5/2007 | Wang | 707/3 |
| 2008/0154798 A1 | 6/2008 | Valz | |
| 2011/0252031 A1 | 10/2011 | Blumenthal et al. | |
| 2011/0320441 A1 | 12/2011 | Lee et al. | |

OTHER PUBLICATIONS

International Search Report dated Sep. 26, 2013 of PCT/EP2013/066107.
Karpischek S. et al: my2cents—Digitizing consumer opinions and comments about retail products, Internet of Things, IEE, Nov. 29, 2010, pp. 1-7.
Jeff Huang et al: Conversational tagging in twitter, Proceedings of the 21st ACM Conference on Hypertext and Hypermedia, Ht, Jan. 1, 2010, pp. 173-177.

* cited by examiner

*Primary Examiner* — Anteneh Girma
(74) *Attorney, Agent, or Firm* — Banner & Witcoff, Ltd.

(57) ABSTRACT

Providing a response to a query comprising receiving a query request, to which a response containing a numerical value is expected, from a querying device, identifying at least one input series as relating to the query request, the or each input series having at least one numerical input measurement, assigning a weighted score to the or each input series identified as relating to the query request, selecting at least one input series from among the input series identified as relating to the query request, the selection being dependent on the weighted score assigned to the or each input series identified as relating to the query request, generating a response to the query request, the response containing a numerical value based on the or on one of the numerical input measurements of the selected at least one input series, thereby providing said response to the querying device.

18 Claims, 10 Drawing Sheets

| Input Series | 1 | | 2 | | 3 | | 4 | | 5 | | 6 | |
|---|---|---|---|---|---|---|---|---|---|---|---|---|
| Input Account | BBC | | Hannah Kuper | | Nigel Wong | | Josh Kemp | | Ed Harding | | Tom Houston | |
| Title | Apple prices | | Price of an apple | | Apple price | | Price of apples | | Recent apple prices | | Price of apples | |
| Units | $ | | £ | | | | $ | | $ | | $ | |
| Followers | 1000 | | 500 | | 35 | | 5000 | | 30 | | 10 | |
| Input via API | Yes | | Yes | | No | | No | | No | | No | |
| Input Account Trust | 10 | | 8 | | 5 | | 5 | | 5 | | 5 | |
| Input Measurements | 2012-06-25 | $0.60 | | | | | 2012-06-25 | $0.62 | | | | |
| | 2012-06-26 | $0.63 | 2012-06-26 | £0.42 | 2012-06-26 | 63 | | | 2012-06-26 | $0.60 | 2012-06-26 | $0.60 |
| | 2012-06-27 | $0.66 | 2012-06-27 | £0.44 | 2012-06-27 | 66 | 2012-06-27 | $0.66 | 2012-06-27 | $0.66 | | |
| | 2012-06-28 | $0.66 | 2012-06-28 | £0.44 | 2012-06-28 | 66 | 2012-06-28 | $0.68 | | | | |
| | 2012-06-29 | $0.66 | 2012-06-29 | £0.44 | 2012-06-29 | 66 | | | 2012-06-29 | $0.66 | | |
| | 2012-06-30 | $0.69 | 2012-06-30 | £0.46 | 2012-06-30 | 69 | | | | | 2012-06-30 | $0.68 |

*FIG. 8*

METHOD AND APPARATUS FOR PROVIDING A RESPONSE TO A QUERY

FIELD

The specification relates generally to providing a response to a query.

BACKGROUND

Electronic devices have been used to access information through various networks including the internet. Hitherto, users have input queries into the search field of a search engine which may be accessed from a website using a web browser. The search engine then retrieves information relating to the query and provides this information to the user. While this has provided a satisfactory way of providing information in many respects, problems have arisen when a user seeks a response containing a numerical value which may change with time. In particular, existing search engines have struggled to identify reliable sources of dynamic numerical data.

SUMMARY

A first exemplary embodiment provides a computer-implemented method of providing a response to a query comprising receiving a query, to which a response containing a numerical value is expected, from a querying device, identifying at least one input series as relating to the query, the or each input series having at least one numerical input measurement, assigning a weighted score to the or each input series identified as relating to the query, selecting at least one input series from among the input series identified as relating to the query, the selection being dependent on the weighted score assigned to the or each input series identified as relating to the query, generating a response to the query, the response containing a numerical value based on the or on one of the numerical input measurements of the selected at least one input series, thereby providing said response to the querying device.

A second exemplary embodiment provides an apparatus configured to receive a query, to which a response containing a numerical value is expected, from a querying device, identify at least one input series as relating to the query, the or each input series having at least one numerical input measurement, assign a weighted score to the or each input series identified as relating to the query, select at least one input series from among the input series identified as relating to the query, the selection being dependent on the weighted score assigned to the or each input series identified as relating to the query, generate a response to the query, the response containing a numerical value based on the or on one of the numerical input measurements of the selected at least one input series, thereby providing said response to the querying device.

A third exemplary embodiment provides an apparatus having at least one processor and at least one memory having computer-readable code stored thereon which, when executed, controls the at least one processor to cause at least one input tile to be displayed, the or each input tile being associated with an input series, wherein the or each input tile comprises a numerical input measurement of the associated input series and a title of the associated input series.

BRIEF DESCRIPTION OF THE DRAWINGS

These embodiments will now be described, by way of example only, with reference to the accompanying drawings, in which:

FIG. 8 illustrates the contents of exemplary input series;

DETAILED DESCRIPTION OF EXEMPLARY EMBODIMENTS

Figure 1:
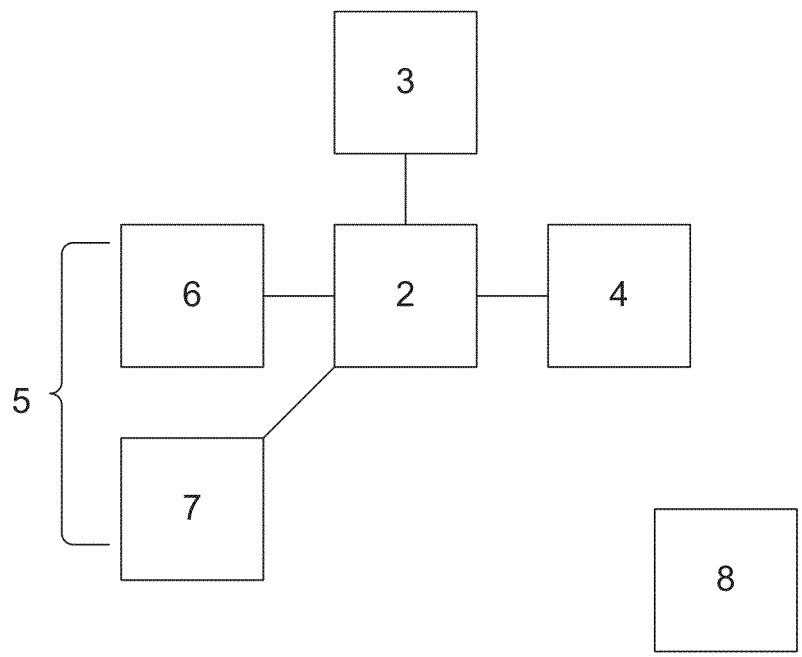
FIG. 1 is a block diagram illustrating internal components of an input device.

FIG. 1 is a block diagram illustrating internal components of an input device 1 according to various embodiments. The input device may be a mobile telephone, a desktop or laptop computer or a personal digital assistant (hereinafter, PDA).

The input device in chides a processor 2 which controls operation of the other hardware components of the input device 1.

The input device 1 comprises a processor 2, working or volatile memory (not shown), such as Random Access Memory (RAM), and a non-volatile memory 3 on which is stored an operating system and software which is executed by the processor 2 to control the hardware components of the input device 1.

The input device 1 is configured to connect to the internet using any suitable fixed or mobile internet access technology such as DSL, mobile broadband or cable. The input device 1 may comprise a network interface 4 to allow the input device 1 to connect to a network such as a local area network (LAN), a wireless local area network (WLAN) or a telecommunications network which may be a 3G or 4G network.

The input device 1 also comprises a user interface 5. The user interface 5 comprises a display 6 and an entry device 7 such as a keyboard or mouse. The display 6 and entry device 7 may be integrated to form a touch sensitive screen.

The input device 1 may also house a battery 8 to power the input device 1, however the input device may be powered by other means such as a mains power source.

Figure 2:
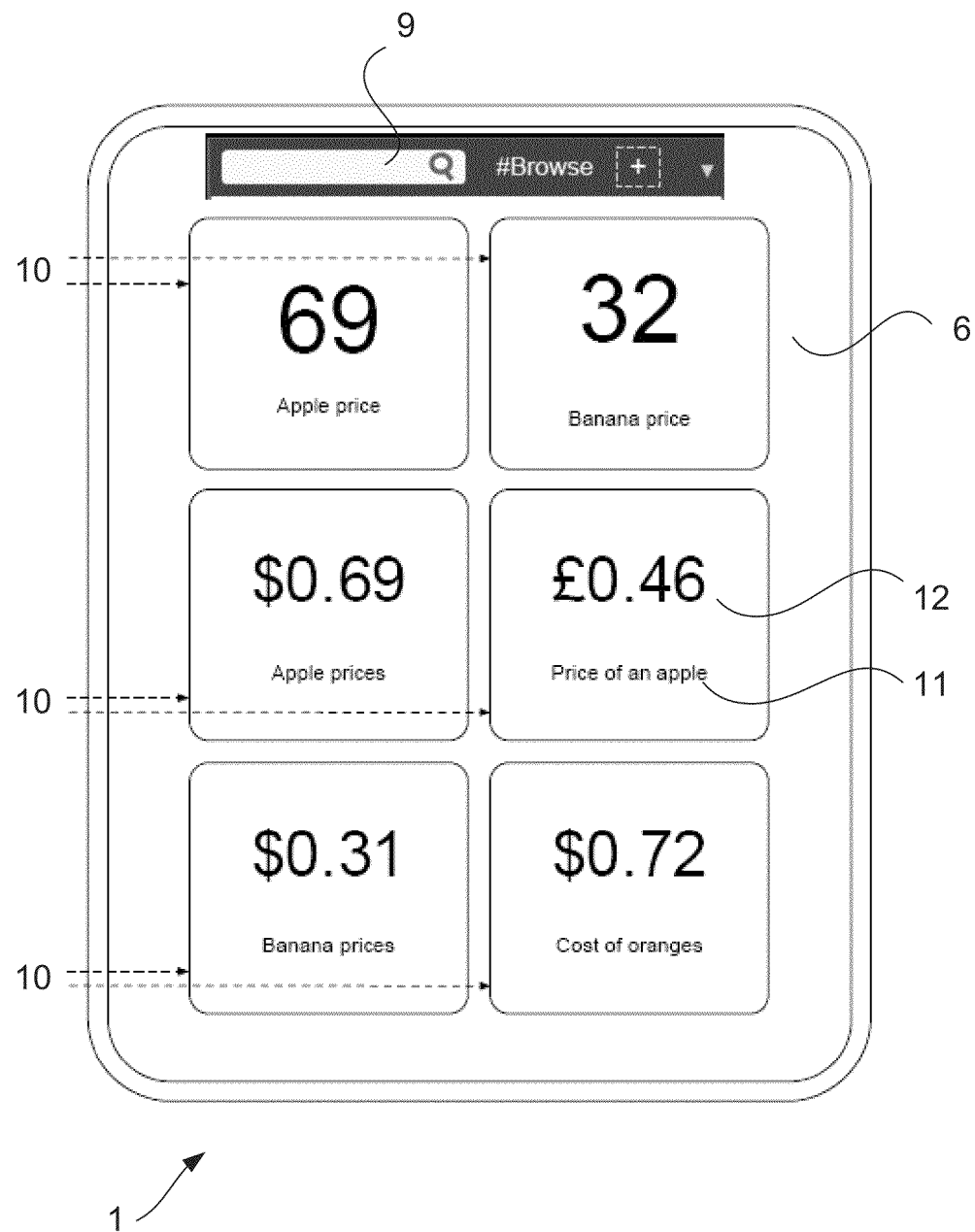
FIG. 2 shows a configuration which the input device may be controlled to display.

FIG. 2 shows a screenshot of an exemplary home page which the processor 2 causes to be displayed on the display 6 of the input device 1 when a user logs in to an input account. The home page may be a web page accessed via a web browser installed onto the input device 1. Alternatively, an application may be installed on to the input device 1. When the application is opened, the home page may be displayed on the display 6 after the user has logged in to his or her input account.

The home page contains a search bar 9 and may be configured to display at least one input tile 10. Each of the input tiles 10 comprises a title 11 and a numerical input measurement 12. Each input tile 10 is associated with an input series and each input series belongs to an input account.

The home page may be accessed when a user logs in to his or her input account. Some of the input tiles 10 displayed on the home page are associated with input series that are owned by the input account of the user of the input device 1, while other tiles are associated with input series that are followed by the input account of the user. Ownership of input series and following input series of other input accounts is described in greater detail below.

The search bar 9 allows the user to input a search query via the user interface 5 in order to find a particular input tile 10. For example, if the user enters "Apple price" into the field of the search bar 9, one or more input tiles 10 having a title 11 containing the words "apple price" appear on the display 6.

As stated above, each input tile 10 displayed on the display 6 of the input device 1 is associated with an input series 13 which comprises the title 11 of the input tile 10 and at least one numerical input measurement 12. The input series 13 may also contain information relating to units of the numerical input measurement. The input series 13 may belong to an input account and information relating to that input account may be contained in the input series 13 as shown in FIG. 3.

The input series 13 is stored in a data store 15 of a server 16. The series server 16 may be accessed by the input device over a network 17. The network 17 may support an internet connection.

The user can create and update the input series 13 using the user interface 5 of the input device 1. For example, the user may create a new input series having a title 11 such as "Price of an apple" and a numerical input measurement 12 such as "£0.40" via the user interface 5. This information may then be provided to the series server 16 over the network 17 and stored in the data store 15 as a new input series. Each numerical input measurement 12 may have an associated time stamp as well as a numerical value. In the example shown in FIG. 3, the first numerical input measurement 12 of the input series 13 has a value of "£0.40" and an associated time stamp of "2012-06-25".

Figure 3:
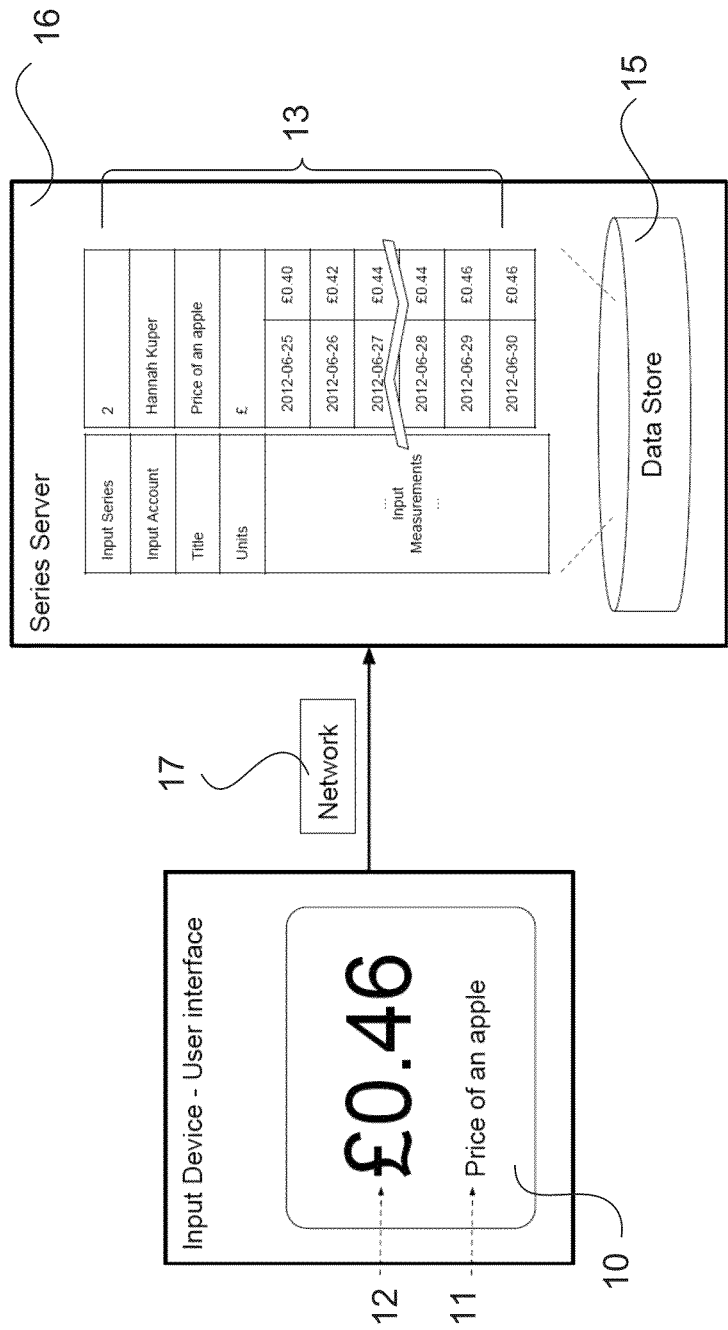
FIG. 3 shows a relationship between an input device and a series server.

FIG. 3 illustrates how the input series 13 may be updated. The user logs into his or her input account and accesses the existing input tile 10 with the title 11 "Price of an apple". The user inputs a new numerical input measurement 12 of "£0.46". This new numerical input measurement is provided to the series server 16 over the network 17. The series server 16 locates the input series 13 that is owned by the input account of the user and which corresponds to the input tile 10. The correct input series 13 may be located by the series server 16 by comparing the title of the input tile 10 with titles of input series stored in the series server 16 which belong to the user's input account. The new input measurement 12 of "£0.46", having an associated time stamp of "2012-06-30" is thereby stored in the data store 15 of the series server 16.

Figure 4:
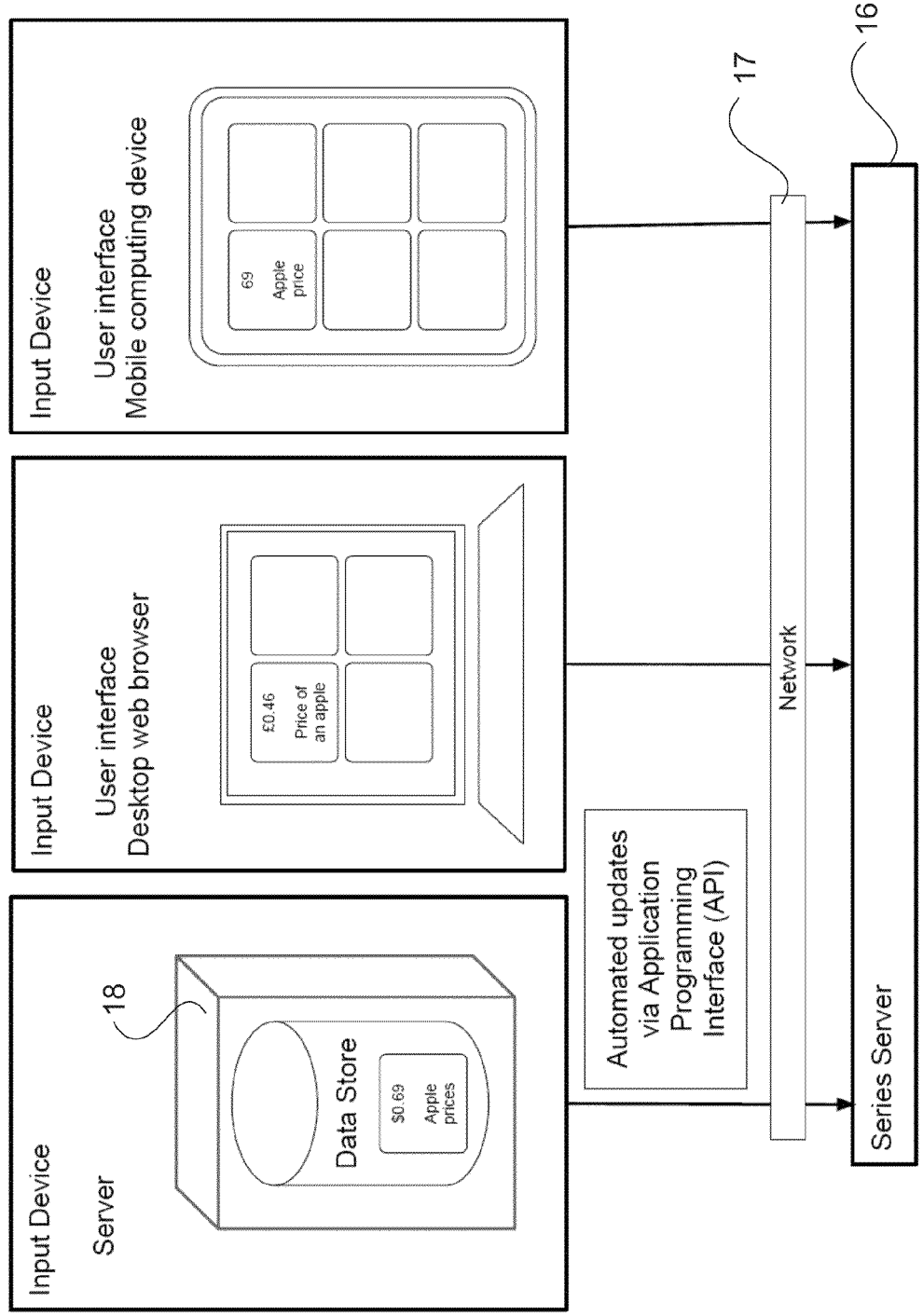
FIG. 4 shows a relationship between several input devices and a series server.

Several input devices may access the series server 16 over the network 17 to create and update input series. Examples of suitable input devices are shown in FIG. 4. A desktop computer and a mobile computing device, such as a smartphone, can create and update input series in the manner described above in relation to FIG. 3. FIG. 4 shows an input server 18 which connects to the series server 16 over the network 17. New input series may be created and existing input series updated automatically via an application programming interface (hereinafter, API), APIs are known in the art as a means for allowing content to be shared by different applications. Therefore, numerical information stored by a server in relation to a website or a social network such as Twitter® or Facebook® may be shared automatically with the series server 16 and the user's input account may be updated automatically. For example, the user may post numerical information on to a social networking site. An input series 13 which belongs to the user's linked input account may be created or updated automatically via the social networking account and API.

As described in the above example, the time stamp associated with a numerical input measurement may be the time at which the numerical input measurement was input. Alternatively, it may be a time value input by a user manually or specified by the API. For example, a user may, on 26 Jun. 2012, enter a value of "£0.42" and an associated time stamp of "2012-06-25". This allows the user to enter a numerical input measurement relating to an earlier time, in this case to enter, on 26 Jun. 2012, the price of an apple on 25 Jun. 2012.

Figure 5:
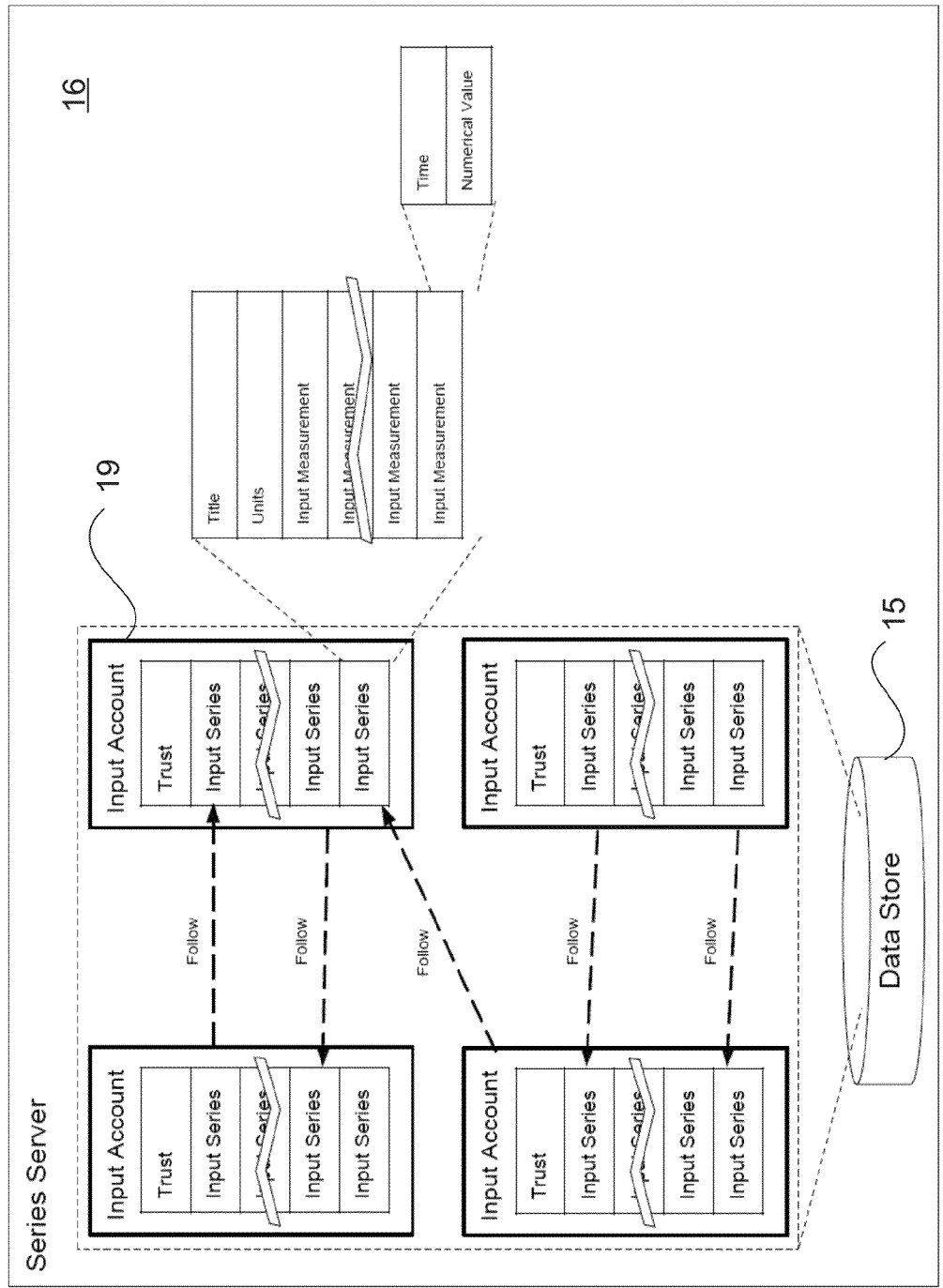
FIG. 5 illustrates organisation of input accounts in a series server.

FIG. 5 shows input series 13 organised according to input accounts 19 according to some embodiments. An input account 19 may be set up by a user to manage his or her input series. A single input account 19 may manage one or more input series. An input account 19 may "follow" an input series belonging to a different input account. That is, each input account 19 may be instructed to monitor a particular input series selected by the user via the user interface 5. Hence the display 6 of an input device 1, when logged in to a particular input account 19, may display input tiles 10 associated with input series owned by that particular input account 19 as well as input tiles 10 associated with input series that are being followed by the input account 19. Such a configuration is shown in FIG. 2 where each input tile 10 displays the most recent numerical input measurement 12 relating to the input series 13.

According to various embodiments, a user may link his or her input account with a social networking account he or she may have with social networks such as Twitter® or Facebook®. As the user creates or updates input series 13, the information therein contained may be shared on these other platforms via a suitable API. Furthermore, the title 11 of the input series 13 may contain a tag, such as a Twitter® hashtag, so that the input series may be easily accessed on these other platforms.

In addition to embodiments which allow an input device 1 to create and update input series belonging to the input account of a user and to follow input series belonging to another input account, embodiments also provide a method of providing a response containing a numerical value to a querying device.

Figure 6:
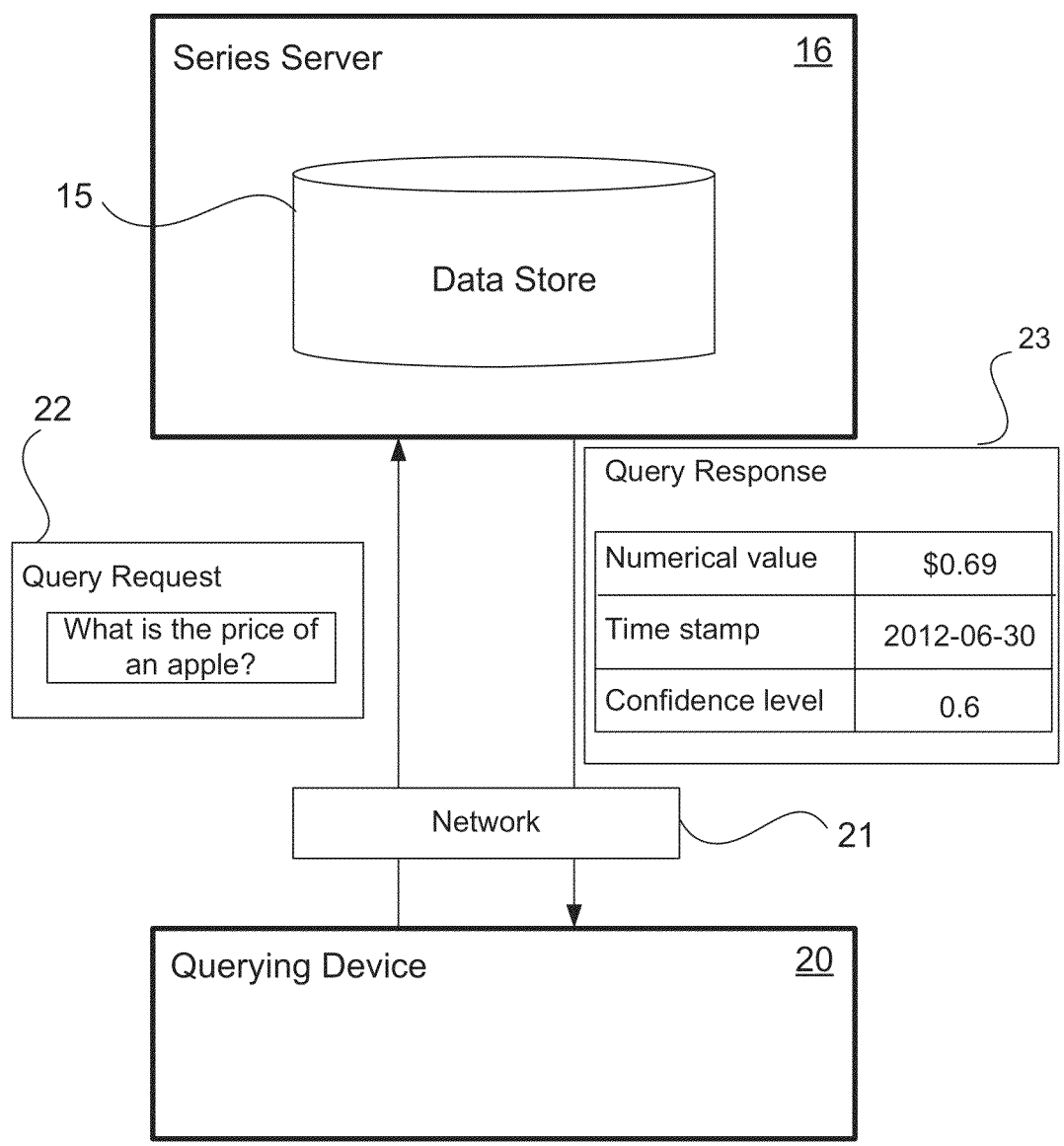
FIG. 6 shows a relationship between a querying device and a series server according to various embodiments.

FIG. 6 shows a querying device 20 connecting to the series server 16 over a network 21. The network 21 over which the querying device 20 may be the same network as the network 17 over which the input device connects with the series server 16. Alternatively, the network 21 may be a different network to the network 17. The network 21 may be a wireless network and may be configured to allow the querying device 20 to connect to the internet.

The querying device 20 may be a similar device to the input device 1. For example, the querying device 20 may be a desktop or laptop computer, a mobile telephone equipped with internet access, such as a smartphone, or a PDA. As such, the internal structure of the querying device 20 will be assumed to be similar to that of the input device 1, shown in FIG. 1 and further description of the internal structure of the querying device 20 will be omitted.

The querying device 20 may have a web browser installed thereon. The series server 16 may be accessed by visiting a web site. The website may be the website of a search engine. Alternatively, an application may be installed on to the querying device 20 which is configured to allow the querying device to connect to the series server 16 over the network 21.

According to embodiments, a user may input a query request 22 via a user interface of the querying device 20 into a search field of website or of an installed application which allow access to the series server 16 over the network 21. The connection with series server 16 may be via an internet connection. The query request 22 entered by the user is a query which the user expects will be answered with an answer containing a numerical value. For example, in FIG. 6, a user enters a query request "What is the price of an apple?". The query request 22 is sent to the series server 16 via the network 21. The series server 16 receives the query request 22 and generates a query response 23 "$0.69" which may be provided by the series server 16, via the network 21, to the querying device 20.

Figure 7:
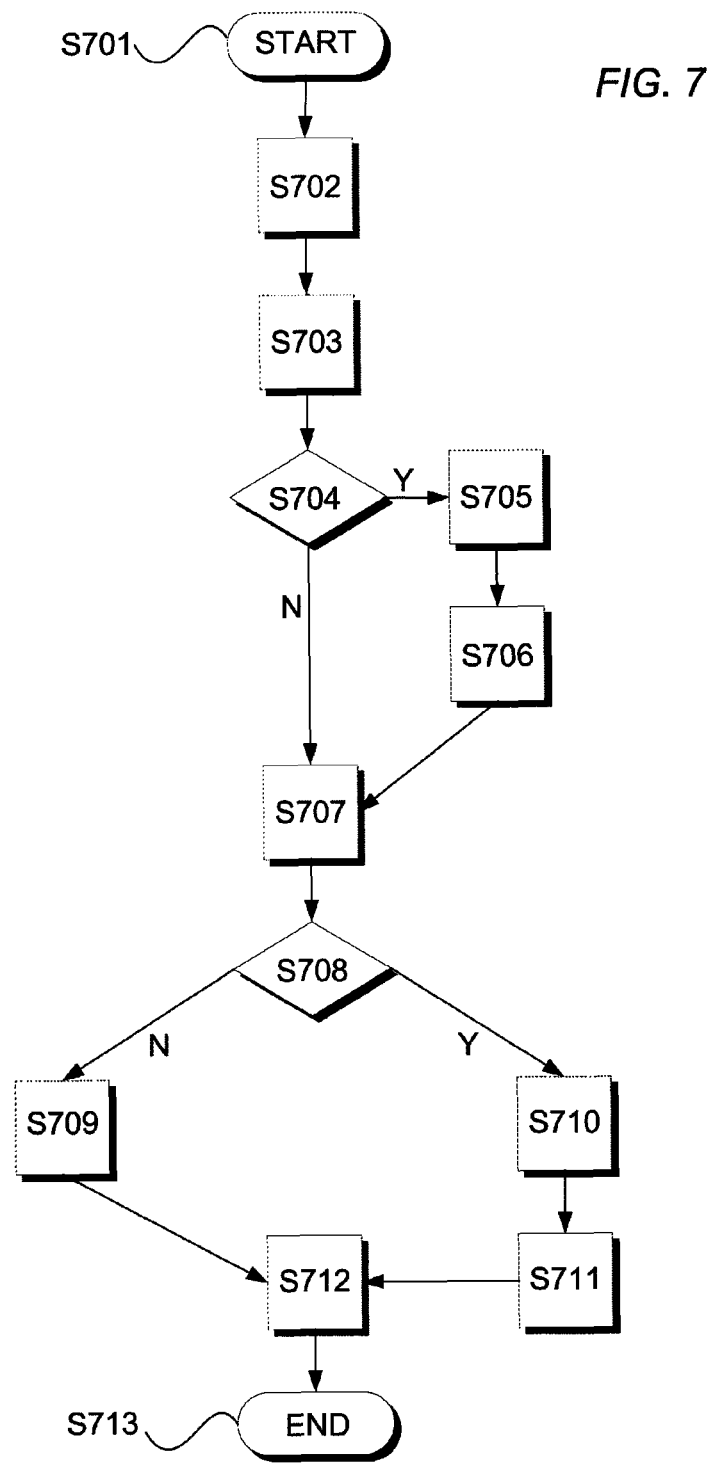
FIG. 7 is a flowchart illustrating exemplary operation of the series server.

FIG. 7 is a flow diagram showing, in greater detail, steps taken by the series server 16 in order to provide a query response 23 to a query request 22.

The process commences at step S701.

At step S702, the series server 16 receives a query request 22, via the network 21, from a querying device 20. Three examples of query requests, all received on 30 Jun. 2012, will be described. In Example 1, the query request received by the series server is "What is the price of an apple?". In Example 2, the query request received by the series server is "What was the price of an apple yesterday?". In Example 3 the query request received by the series server is, "What was the price of an apple on 25/06/2012?".

At step S703, the series server 16 analyses the content of the query request 22 to identify any input series 13 stored in the data store 15 that may be related to the query request 22. The series server 16 may match words contained within the query request 22 with words contained in the title of an input series 13 stored in the data store 15.

In Examples 1-3, six input series are identified having titles containing the words "price" and "apple" and these input series are shown in FIG. 8 at step S703.

At step S704, the series server 16 determines whether the query request 22 contains a time component. The series server 16 determines that the query request 22 does contain a time component, the process moves on to step S705. If the series server 16 determines that the query request 22 does not contain a time component, the process moves on to step S707.

At step S705, any input series identified at step S703 that does not have a numerical input measurement having an associated time stamp corresponding to the time component of the query request is excluded from the process by the series server 16. Whether an associated time stamp of the numerical input measurement corresponds to the time component of the query request may vary according to various embodiments. For example, a time stamp having the same date as the time component of the query request may correspond in some embodiments. In other embodiments, a time stamp which is within a certain predetermined time period prior to the time component of the query request may correspond.

In Example 1, the series server 16 determines from the text "what is the price of an apple?" that the query request 22 contains a time component of 30 Jun. 2012, at step S704. Input series that do not contain a numerical input measurement having an associated time stamp showing 30 Jun. 2012, in this case input series 4 and 5, are therefore excluded at step S705. In Example 2, the word "yesterday" is interpreted by the series server 16, at step S704, to correspond to a time component of 29 Jun. 2012. Input series 4 and 6, shown in FIG. 8, are therefore excluded since they do not have a numerical input measurement having an associated time stamp of 29 Jun. 2012 at step S705. In Example 3, the text in the query request "25/06/2012" is interpreted by the series server 16 to correspond to a time component of 25 Jun. 2012 at step S704. Input series 2, 3, 5 and 6, shown in FIG. 8, are excluded at step S705 because they do not have a numerical input measurement with an associated time stamp of 25 Jun. 2012.

In embodiments that include the optional step S706, the series server 16 excludes any numerical input measurement of an input series that has an associated time stamp that is later than the time component of the query request 22. In Example 2, the numerical input measurements from input series 1, 2, 3 and 6 having an associated time stamp of 30 Jun. 2012 are excluded. In Example 3, all numerical input measurements from input series 1-6 having a time stamp of 26 Jun. 2012 or later are excluded.

At step S707 a weighted score is assigned to each input series identified at step S703 and which has not been subsequently excluded at any intervening step of the process. The weighted score assigned to an input series may be dependent on any of several reliability indicators pertaining to that input series.

Referring again to FIG. 8, reliability indicators, according to embodiments, might include the number of input accounts that follow a particular input series, with a high number of followers indicating a more reliable input series.

A trust score may be associated with the input account to which the input series belongs. A trust score may be a score applied to an account by a third party. The trust score may be derived from ratings applied to the input series based on past performance. Alternatively, an input account belonging to a respected source of information such as an online encyclopaedia or news source may carry a high trust score.

Whether the input series is updated manually or via an API may also provide a indicator, with those input series updated automatically by API being more reliable than those updated manually. Furthermore, the frequency at which an input series is updated may be used as a reliability indicator, with an input series having a higher update frequency suggesting greater reliability than an input series having a lower frequency. The time elapsed since the input series was last updated may also be taken into account as a reliability indicator, with a more recently updated input series being preferred to an input series that has not been updated for a longer time.

Multiple input series may be compared to see whether the numerical input measurements of each of the multiple input series correlate well over time. When comparing two or more input series, the units of the respective input series may be taken into account. For example, one input series might measure a price in units of $ while another input series might measure a price in units of £. If the $/£ exchange rate varies little over a few days, the numerical input measurements in the two input series may correlate well when values are adjusted using a $/£ exchange rate which may be accessed by the series server 16. Similarly one input series might measure a price in units of cents and numerical input measurements may correlate well with an input series measured in units of $ when scaled by a multiple of 100.

In Example 1, input series 4 and 5, shown in FIG. 8, were excluded at step S705, leaving input series 1, 2, 3 and 6. Input series 1 has more followers than input series 2, 3 and 6. Input series is updated automatically via API, whereas input series 3 and 6 are updated manually. Input series 1 also has a higher trust score than input series 2, 3 and 6. As such, since input series outperformed input series 2, 3 and 6 with respect to each reliability indicator, input series 1 is assigned a significantly higher weighted score than input series 2, 3 and 6 at step S707.

In Example 2, input series 4 and 6 were excluded at step S705, leaving input series 1, 2, 3 and 5 in the process. Input series 1 has more followers than input series than input series 2, 3 and 5. Input series 1 is updated automatically via API, whereas input series 3 and 5 are updated manually. Input series 1 also has a higher trust score than input series 2, 3 and 5. As such, since input series 1 outperformed input series 2, 3 and 6 with respect to each reliability indicator, input series 1 is assigned a significantly higher weighted score than input series 2, 3 and 5 at step S707.

In Example 3, input series 2, 3, 5 and 6 were excluded at step S705, leaving input series 1 and 4 in the process. Input series 1 is updated via API whereas input series 4 is updated manually. This distinction favours input series 1. Furthermore, input series 1 has a higher trust score than input series 4. However, input series 4 has more followers than input series 1. As such, input series 1 and input series 4 are assigned a similar weighted score at step S707.

At step S708 the series server 16 decides whether to use more than one input series to generate a query response 23. If the series server 16 decides not to use more than one input series to generate a query response 23, the process moves on to step S709. If the series server 16 does decide to use more than one input series to generate a query response 23, the process moves on to step S710.

In Examples 1 and 2, at step S708 a decision is taken by the series server 16 to use a single input series to generate the query response 23. This decision is based on the fact that input series 1 was assigned a significantly higher weighted score than the other input series at step S707. The process therefore moves on to step S709 of the process.

At step S709, the latest numerical input measurement not to be excluded at step S706 is selected from the input series that was selected at step S708. In Example 1, the latest non-excluded numerical input measurement is "$0.69" since no numerical input measurements were excluded at step S706 and input series 1 was selected at step S708. In Example 2, the latest non-excluded numerical input measurement is "$0.66" since all numerical input measurements having an associated time stamp later than 29 Jun. 2012 were excluded at step S706 and input series was selected at step S708. In Examples 1 and 2 the series server generates a query response 23 containing "$0.69" and "$0.66" respectively.

In Example 3, a decision is taken at step S708 to use more than one input series to generate the query response 23. This is because input series 1 and input series 4 were assigned a similar weighted score at step S707. In this case the process moves from step S708 to step S710.

At step S710 a numerical value to be included in the query response 23 is calculated. The latest numerical input measurements from the input series selected at step S708 which were not excluded at step S706 are used to calculate the numerical value to be included in the query response 23. In Example 3, all numerical input measurements of input series 1-6 having an associated time stamp later than 25 Jun. 2012 were excluded at step S706. At step S708, input series 1 and 4 were selected. The latest non-excluded numerical input measurements from input series 1 and 4 are "$0.60" and "$0.62" respectively.

The numerical value to be included in the query response 23 may be calculated in one of several ways. In some embodiments, an average of the input measurements may be calculated. The average may be a mean, mode or median average. In other embodiments, other statistical methods may be used to calculate the numerical value to be included in the query response 23. In yet further embodiments, if the more than one selected input series have different weighted scores the respective weighted score of each input series may be taken into account.

In Example 3, the numerical value to be included in the query response 23 may be "$0.61".

Step S711 is an optional step wherein units to be included in the query response 23 are determined. If the selected one or more input series use the same units then the series server 16 will generate a query response 23 using those units. However, if different units are used by the respective input series then a selection is made at step S711 as to which units to include in the query response 23. This selection may be based on factors such as the geographical location of the querying device 20. For instance, if the querying device 20 is located in the USA the query response may be expressed in units of "$". Alternatively, the query response may be denominated "£" for querying devices located in the UK and so forth. Alternatively, the selection of units may be based on preselected user preferences.

At step S712 the series server 16 generates the query response 23 based on the numerical values obtained from previous steps in the process. The query response 23 may comprise a time component which may be derived from the time stamp associated with the one or more numerical input measurements used to generate the query response 23. The time component thereby provides the user with an indication of the age of the data which has been used to generate the query response.

The query response 23 may comprise a confidence level. In embodiments where a confidence level is used, it provides the user with an indication of the level of confidence he or she may have in the query response 23. The confidence level may be related to or derived from the weighted score assigned to the input series at step S707 and may be calculated using an algorithm stored in the data store 15.

The query response 23 may be provided to the querying device 20 via the network 21. The query response 23 may then be displayed on a user interface of the querying device 20.

The process ends at step S713.

Figure 9:
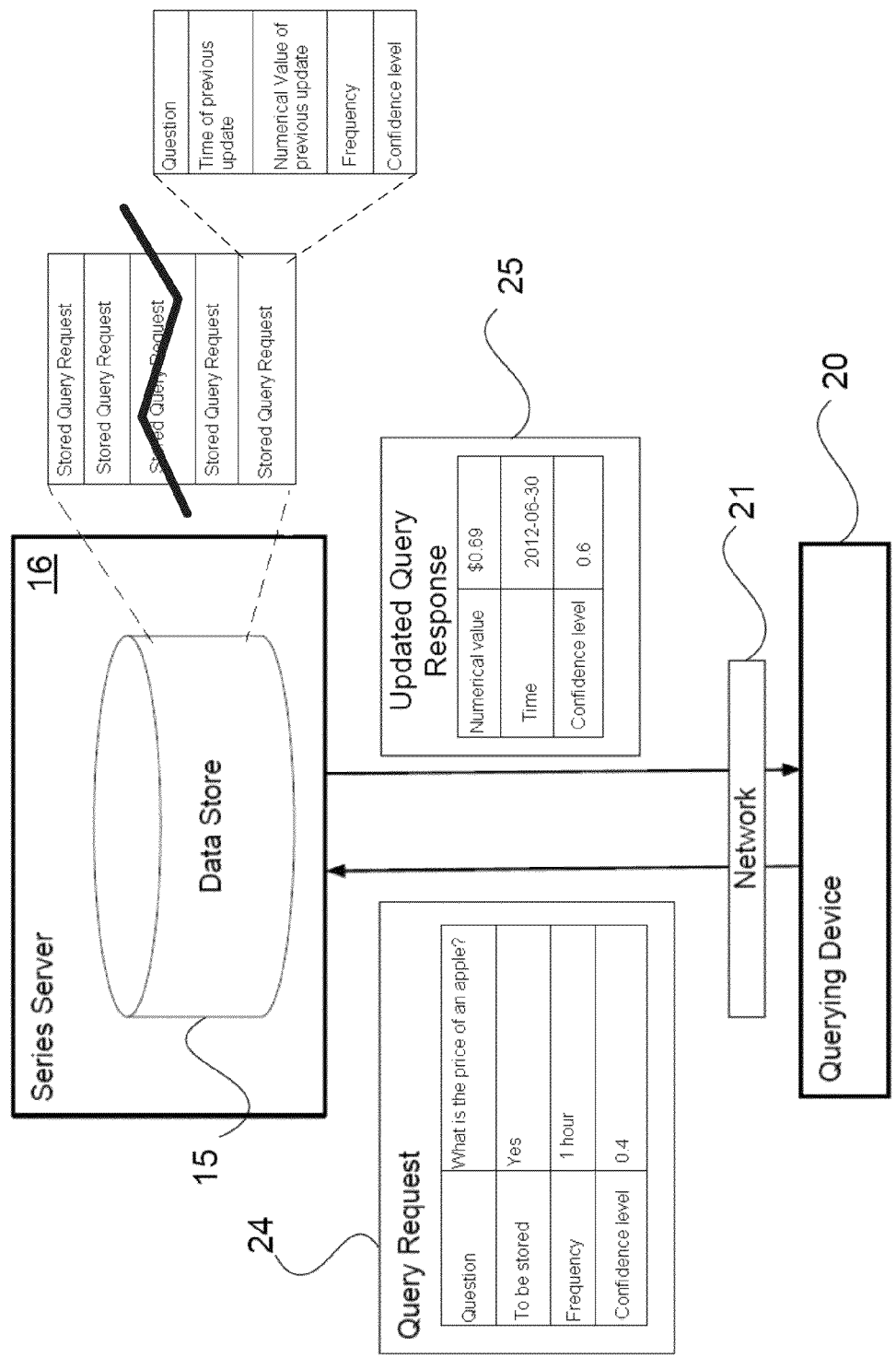
FIG. 9 shows a relationship between a querying device and a series server according to various other embodiments.

FIG. 9 shows a querying device 20 connecting to the series server 16 over a network 21 according to various embodiments. In these embodiments, the querying device 20 sends a query request 24 to the series server 16 over the network 21 and may receive an initial query response similar to the query response 23 via the process as hereinbefore described with reference to FIG. 7. In these embodiments the series server 16 may further provide an updated query response 25 to the querying device 20, in addition to the initial query response, if requested to do so in the query request 24.

The user may include in the query request 24, in addition to a question such as "What is the price of an apple?", a request for an updated query response to be sent to the querying device 20 provided that certain update criteria are met. The request for an updated query response may include an instruction to the series server 16 that the query request 24 is to be stored in the data store 15.

The query request 24 is therefore stored in the data store together with information relating to the most recent query response that has been provided to the querying device 20. For example, the time that an initial query response was provided to a querying device, the time at which the most recent updated query response was provided to a querying device, and the numerical value contained within the initial query response or in the most recent updated query response may be stored in the data store 15.

In general, the updated query response may be generated and provided to the querying device 20 in response to an input series 13 being created or updated by an input device 1 after an initial query response, such as the query response 23, has been provided to the querying device 20.

Update criteria that are to be met before an updated query response is provided may be included in the query request 24 and stored in the data store 15. Examples of update criteria include a frequency criterion and a confidence level threshold. The user may input, via the user interface 5 of the querying device 20, a value of 1 hour as a frequency criterion. This means that no updated query response will be sent within 1 hour of the latest response to the query request which may an initial response or an updated response. The user may input, via the user interface 5 of the querying device 20, a threshold confidence value of, for example, 0.4. Any updated query response having a confidence value below this threshold will not be sent to the querying device 20.

Figure 10:
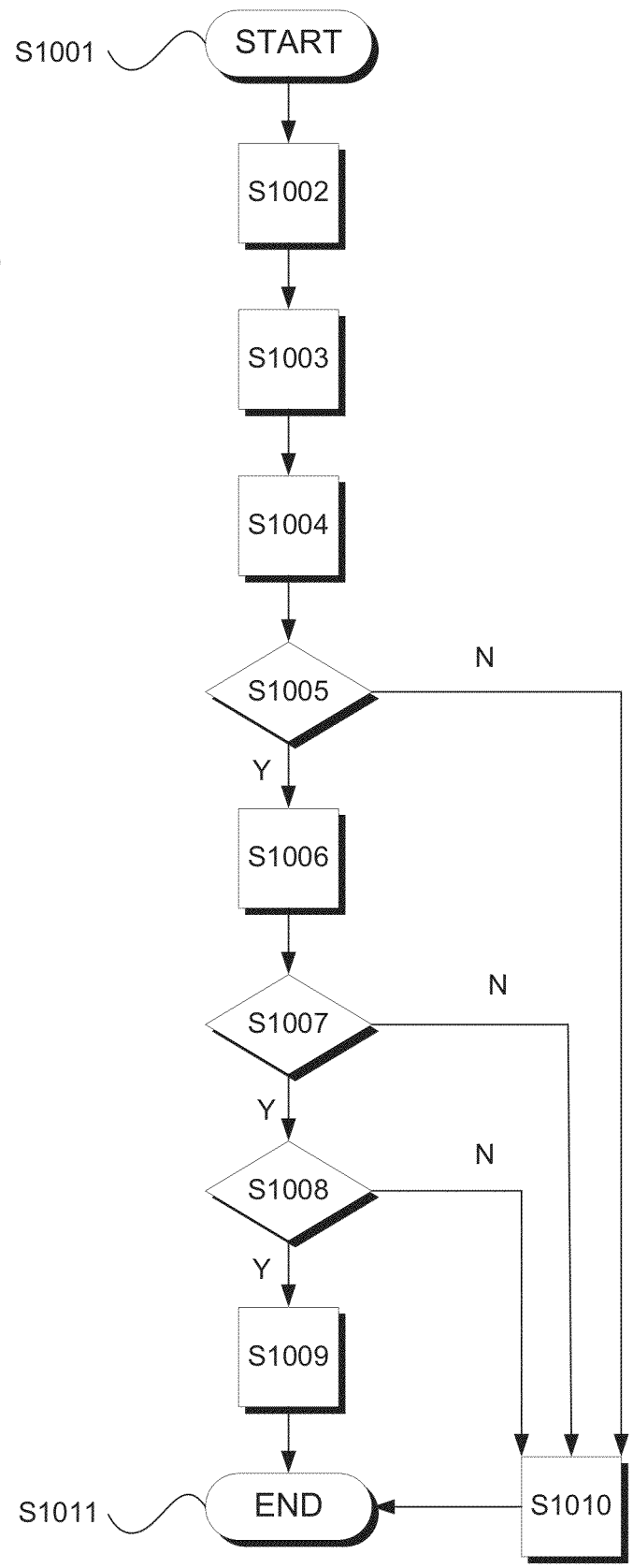
FIG. 10 is a flowchart illustrating operation of the series server according to various embodiments.

FIG. 10 is a flow diagram showing, in greater detail, steps taken by the series server 16 in order to provide an updated query response 25.

The process commences at step S1001.

At step S1002, an input device 1 creates or updates an input series 13 in a manner substantially as described above with reference to FIGS. 3 and 4.

At step S1003, the series server 16 analyses the title of the input series created or updated at step S1002 and searches for query requests that have been stored in the data store 15 of the series server 16 that contain matching text in the question.

At step S1004, the series server 16 selects each matching stored query request individually and goes through the subsequent steps of the process with each one in turn.

Step S1005 is performed in embodiments where a querying device has specified a frequency criterion in the query request 24. At step S1005, the series server 16 determines whether the time difference between the most recent query response and the current time is greater than the frequency criterion included in the query request. If the time difference between the most recent query response and the current time is greater than the frequency criterion included in the query request the process moves on to step S1006. If the time difference between the most recent query response and the current time is less than the frequency criterion included in the query request then the process moves onto step S1010. It should be borne in mind that the most recent query response may be an initial query response provided to the querying device directly after the query request was sent or it may be the most recent updated query response.

At step S1006, the series server performs the process described above with reference to FIG. 7 to generate a query response from step S704 onwards. New numerical input measurements that are part of a new input series or that form an update to an existing input series are taken into account at this step to generate an updated query response.

At step S1007 the series server 16 determines whether the numerical value generated at step S1006 has a different value to the numerical value contained in the latest query response to be provided to the querying device, whether that was the initial query response or the latest updated query response. If the numerical value is different then the process continues to step S1008. If the numerical value is not different from the numerical value contained in the latest query response to be provided to the querying device then the process continues to step S1010.

At step S1008, the series server 16 determines whether the response generated at step S1006 has a confidence level above the confidence level threshold specified in the query request 24. If the response generated at step S1006 does have a confidence level above the confidence level threshold specified in the query request 24 then the process continues to step S1009. If not, then the process continues to step S1010.

At step S1009, the updated query response 25 is provided to the querying device 20. The information relating to the query request that is stored in the data store is updated to reflect the time at which the updated query response 25 was provided to the querying device 20 and the numerical value contained within the updated query response 25. The updated query response 25 may be displayed on a display of the querying device 20.

At step S1010, the series server 16 decides not to provide an updated query response to the querying device 20.

The process ends at step S1011.

It will be appreciated that the above described embodiments are purely illustrative and are not limiting on the scope of the claims. Other variations and modifications will be apparent to persons skilled in the art upon reading the present application.

For example, time stamps and time components have been described in the above described embodiments to a resolution of days. In other embodiments, time may be recorded in query requests and responses to a resolution of years, months, hours, minutes, seconds or fractions of seconds. In preferred embodiments, time resolution to shorter time periods, such as fractions of seconds, provides improved data quality to resolution to longer time periods.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A computer-implemented method of providing a response to a query comprising:
   receiving a query request, to which a response containing a numerical value is expected, from a querying device;
   identifying at least one input series as relating to the query request, the or each input series containing at least one numerical input measurement corresponding to a potential response to the query request;
   assigning a weighted score to the or each input series identified as relating to the query request;
   selecting at least one input series from among the input series identified as relating to the query request, the selection being dependent on the weighted score assigned to the or each input series identified as relating to the query request;
   generating and providing an individual response to the query request by drawing on a plurality of data sources, wherein each data source is an input series containing at least one numerical input measurement, the response containing a numerical value derived from the or one of the numerical input measurements contained within the selected at least one input series, thereby providing said individual response to the querying device.

2. The method according to claim 1, further comprising causing said response to be displayed on a display of said querying device.

3. The method according to claim 1, wherein the or each numerical input measurement has an associated time stamp.

4. The method according to claim 3, wherein the weighted score assigned to the or each input series identified as relating to the query request is dependent at least partially on time elapsed since the time stamp of the latest numerical input measurement of the or each of the input series identified as relating to the query request.

5. The method according to claim 1, wherein the or each input series belongs to a user account.

6. The method according to claim 5, wherein the user account has a trust score and the weighted score, assigned to the or each input series identified as relating to the query request, is dependent on said trust score.

7. The method according to claim 1, wherein the or each input series has a number of followers and the weighted score, assigned to the or each input series identified as relating to the query request, is dependent on said number of followers.

8. The method according to claim 1, wherein the weighted score assigned to the or each input series identified as relating to the query request is dependent on a frequency at which a plurality of numerical input measurement is entered.

9. The method according to claim 1, wherein the weighted score assigned to the or each input series identified as relating to the query request is dependent on whether the or each input series is modified using an application programming interface.

10. The method according to claim 1, wherein the query request contains a time component and wherein the apparatus is further configured to extract the time component from the query request.

11. The method according to claim 10, further comprising excluding from the response any numerical input measurement having an associated time stamp later than the time component of the query request.

12. The method according to claim 1, further comprising identifying at least one input series as relating to the query request by comparing the query request with a title of an input series.

13. The method according to claim 1, further comprising storing the query request and providing an updated query response in response to an update criterion being met.

14. The method according to claim 13, wherein the update criterion is a frequency criterion and/or a confidence level threshold.

15. A non-transitory computer-readable storage medium having stored thereon computer-readable code, which, when executed by computing apparatus, causes the computing apparatus to perform a method according to claim 1.

16. An apparatus comprising:
a processor; and
a memory storing instructions that, when executed, cause the apparatus to:
receive a query request, to which a response containing a numerical value is expected, from a querying device;
identify at least one input series as relating to the query request, the or each input series containing at least one numerical input measurement corresponding to a potential response to the query request;
assign a weighted score to the or each input series identified as relating to the query request;
select at least one input series from among the input series identified as relating to the query request, the selection being dependent on the weighted score assigned to the or each input series identified as relating to the query request;
generate and provide an individual response to the query request by drawing on a plurality of data sources, wherein each data source is an input series containing at least one numerical input measurement, the response containing a numerical value derived from the or one of the numerical input measurements contained in the selected at least one input series, thereby providing said response to the querying device.

17. The method according to claim 1, wherein the response provided to the user further comprises a time component and/or a confidence level.

18. The method according to claim 1, wherein the numerical value contained in the response is derived from the or one of the numerical input measurements contained within the selected at least one input series using a statistical analysis of the numerical input measurements.

* * * * *